N. G. WILLIAMS.
ANIMAL MUZZLE.
APPLICATION FILED NOV. 12, 1914.

1,175,033.

Patented Mar. 14, 1916.

Witnesses:
Hugh L. Kirby
H. Birnbach

Inventor
Nance Gwyn Williams
By her Attorney
W. H. Clarke

UNITED STATES PATENT OFFICE.

NANCE GWYN WILLIAMS, OF NEW YORK, N. Y.

ANIMAL-MUZZLE.

1,175,033.   Specification of Letters Patent.   Patented Mar. 14, 1916.

Application filed November 12, 1914. Serial No. 871,661.

*To all whom it may concern:*

Be it known that I, NANCE GWYN WILLIAMS, a citizen of the United States, residing at 200 West Fifty-eighth street, New York, N. Y., have invented a new and useful Improvement in Animal-Muzzles, of which the following is a specification.

This invention relates to animal muzzles.

Existing muzzles of which I am aware are constructed in various ways on the principle of binding the lower jaw of the animal to the upper jaw by means of strap or band passing under the lower jaw and over and around the nose.

While the existing type of muzzle may be more or less satisfactory for the average type of dog, having an ordinary nose, it is quite unsatisfactory, in fact, practically impossible to use such type of muzzle in connection with a dog having a receding or shortened nose, like a Pekinese pug and some types of bulldogs.

The present invention is intended to provide for the effective muzzling of Pekinese pugs and other similar types of dogs, which are difficult, if not impossible, to muzzle with existing appliances, but although the principle of the present invention is particularly adapted for muzzling that type of animal, it is to be fully understood that the device of the present invention may be used on other types of animals.

The present invention aims to take advantage of the fact that the skull and the upper jaw of the dog are relatively immovable or fixed with regard to each other, and that the lower jaw is articulated so as to move relatively to both the skull and the relatively fixed upper jaw. In taking advantage of this fact, I provide a form of harness by means of which the lower jaw, instead of being secured to the upper jaw, is secured rather to the skull of the animal, with the result that the necessity of providing any transverse strap across the bridge of the nose, which strap would pull down on the top of the noze when the dog tried to open its mouth, is effectually avoided, and the strain on the harness incident to any effort of the dog to open its mouth is taken up and resisted by and spread over the entire skull and forehead of the dog.

A muzzle constructed in accordance with the present invention is shown in the accompanying drawing, forming part of this specification, it being understood that changes in the precise embodiment of the invention herein disclosed and claimed can be made within the scope of the claims and as indicated by the variations in the different claims, without departing from the present invention.

Figure 1:
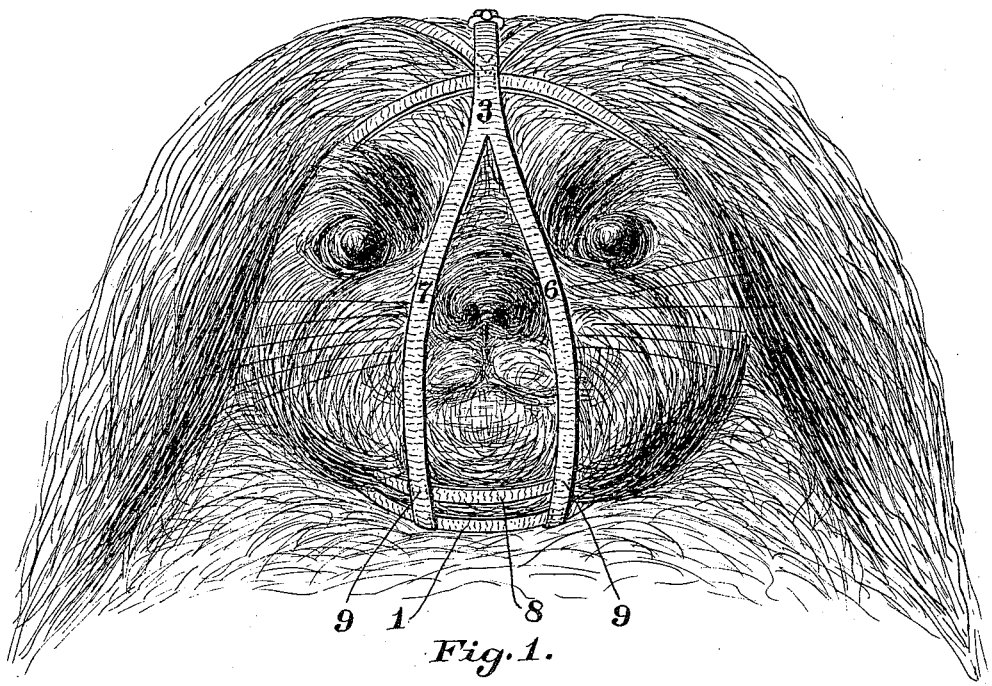
Figure 2:
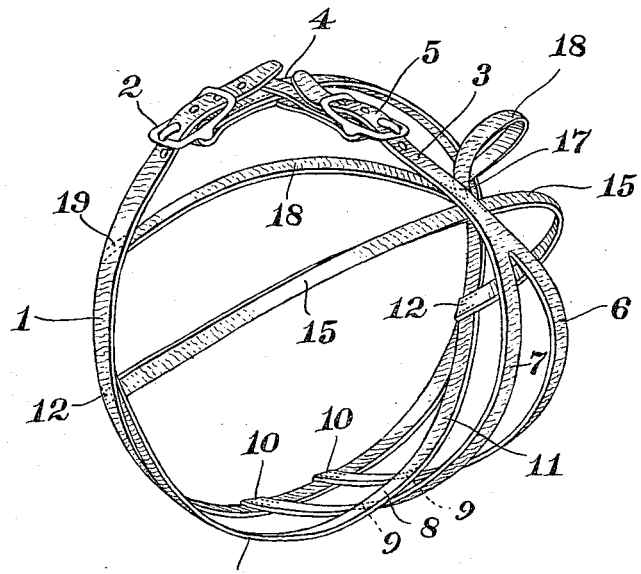

In the drawings Figure 1 is a view showing a Pekinese pug equipped with a muzzle constructed in accordance with the present invention. Fig. 2 is a detail perspective view of the muzzle removed from the dog.

The muzzle of the present invention comprises a neckband 1 which extends around the neck of the animal like an ordinary collar. The ends of the neckband are detachably secured in any suitable manner, such as by means of the buckle 2. In removing or applying the muzzle, it is only necessary to open the neckband.

Extending forward from the upper portion of the neckband 1 is a center band 3 which is slidably and adjustably secured to the neckband 1 by means of a loop 4, loosely surrounding the neckband. The center band 3 is adjustably secured to the loop 4 in any suitable manner, such as by means of the buckle 5, by means of which the center band can be tightened or loosened to accommodate different sizes of dogs. The center band 3, at a point on the forehead, is provided with the forks 6 and 7, which preferably, although not essentially, are formed by splitting the center band 3. The forks 6 and 7 pass downward and around the nose and mouth of the animal, being located, as shown, between the eyes and the nose.

For the purpose of providing a loop to pass under the lower jaw of the animal, the chin band 8 is employed, this band extending transversely below the jaw and being stitched or otherwise secured to the forks 7 and 8 at a point marked 9—9. After being stitched to the chin band 8, the lower ends of the forks 6 and 7 are carried rearwardly and stitched or otherwise secured to the neckband 1, as indicated at 10—10, thus providing means for spacing the chin band 8 the proper distance forward of the neckband 1. The chin band 8, in addition to extending between the forks 6 and 7, is provided with end portions 11—11, which extend upward and backward around the lower jaw of the animal and are stitched to the neckband 1 at the point marked 12. It will be observed that the chin band 8 with its diagonal ends 11 serves as an additional means connected with the neckband to prevent the drooping or opening of the lower jaw of the animal, and also serves to space and hold the forks 6 and 7 in proper relation, said forks in turn serving to hold said chin band in proper relation.

Connected with the center band 3 at a point on the forehead is a pair of lower forehead bands 15—15 which extend in opposite directions over the forehead of the animal between the eyes and the ears, and are stitched or otherwise connected to the neckband at the points 12, where the chin band 8 joins the neckband. Also connected with the center band 3 at the point marked 17 is a pair of upper forehead bands 18—18, which extend in opposite directions behind the ears of the animal and are stitched or otherwise connected with the neckband at the points marked 19. It will be observed that the upper and lower forehead bands and the center band 3 are all stitched together at the point marked 17 so as to form a rosette on the forehead of the animal. The upper and lower forehead bands 15 and 18, while passing on opposite sides of the ears and acting in connection with the other elements, serve to provide means for preventing the muzzle from getting twisted or turned on the head of the animal.

The muzzle described forms an effective harness by means of which the lower jaw of the animal is firmly fixed relatively to the skull and upper jaw, and this is accomplished without any strap or saddle extending across or around the bridge of the nose.

The muzzle of the present invention is strong, simple, durable and inexpensive in construction as well as thoroughly efficient in action. It can be removed and replaced by merely opening the neckband.

What is claimed as new is—

1. A muzzle comprising a band adapted to extend beneath the animal's chin and crosswise thereof a material distance in front of the throat of the animal, a center band having a pair of forks extending across the chin band and secured thereto at separated points, the forks being adapted to extend forward and upward along the sides of the animal's nose, and a neck band adapted to be secured to the opposite extremities of the chin band and the center band.

2. A muzzle comprising a band adapted to extend beneath the animal's chin a material distance in front of the throat of the animal, a center band having a pair of forks extending across the chin band and secured thereto at separated points, the forks extending forward and upward along the opposite sides of the animal's nose, a neck band adapted to be secured to the opposite extremities of the center band and the ends of the chin band, and a pair of forehead straps connected to the center band and to the neck band adjacent the chin band, and a second pair of forehead straps connected to the center band and the neck band above the first pair.

In witness whereof, I have signed my name to this specification in the presence of two subscribing witnesses, November 1914.

NANCE GWYN WILLIAMS.

Witnesses:
GEO. B. DE LUCA,
H. BIRNBACH.

Copies of this patent may be obtained for five cents each, by addressing the "Commissioner of Patents, Washington, D. C."